R. B. BOYMAN.
Improvement in Propulsion of Vessels.

No. 115,425.  Patented May 30, 1871.

Witnesses.
Jan'a Austin
Kate N. Jones

Inventor
Richard Boyman Boyman
Per Burke Fraser & Osgood, attys.

R. B. BOYMAN
Improvement in Propulsion of Vessels.
No. 115,425.
Patented May 30, 1871.

UNITED STATES PATENT OFFICE

RICHARD BOYMAN BOYMAN, OF LONDON, ENGLAND.

IMPROVEMENT IN PROPULSION OF VESSELS.

Specification forming part of Letters Patent No. 115,425, dated May 30, 1871.

*To all whom it may concern:*

Be it known that I, RICHARD BOYMAN BOYMAN, of London, England, have invented certain new and useful Improvements in Propelling Vessels and Aerial Machines by Reaction, and in the machinery for the same, part of which is applicable to other purposes; and I do hereby declare that the following is a full, true, and exact description thereof, reference being had to the accompanying drawing.

The object of my invention is to save from forty to fifty per cent. of the fuel consumed in steam navigation (and that which would be consumed in aerial machines) propelled by paddle-wheel or screw; and also a proportionate part of their large area of propeller, and weight, and stowage of engines, boilers, water, and fuel, and reduce the cost of construction. It is also designed to afford protection against the two greatest dangers of navigation—leakage and fire. When water is drawn into a pipe without a diverging entrance, a contraction of the fluid takes place. This entails a loss of power, and a further loss is occasioned by bends or contractions in the pipe. A loss also occurs in proportion to its length, in consequence of the friction of the propelling water. To reduce these losses as much as can be done, I have a reaction-tube, with or without expanding or contracting valves, having a diverging entrance, as free from bends and contractions, and as short as possible, and answer the purpose. To get these advantages I fix the pipes outside the vessel, one on each side, or under it on each side of the keel. Each tube has a divergent opening at the other end (the reaction end) to prevent loss of velocity at the entrance there when the hydro-propeller is reversed for backing. This tube is fixed with its mouth toward the bow of the vessel that the water for propelling may enter with the velocity due to the advancing vessel and be discharged for reaction as nearly as possible on a level with the entrance. The object of this is twofold: First, that the propeller-floats may have in their favor such velocity of the advancing vessel instead of having to give the water such velocity, which would lose just so much engine-power. Second, to preserve the same statical pressure of the external water on both sides of the propeller-floats when the vessel is in motion as when at rest. In this way the external pressure of the water on the bow side of the floats will enable them to overcome the pressure of the external water on the stern side, and so leave the reaction water free to overcome the resistance. Such a reaction-tube as I have described embodies the fundamental principles of my invention. How the water for propulsion may be drawn into such tubes and expelled for reaction is a secondary consideration, because this may be done in several ways, while there is only one way of making hydro-propulsion an economical application of power, and that is by such a reaction-tube as I have invented and described, for that alone embodies the principles which I have discovered and previously explained for the proper application of hydro-propulsion.

I will now describe different ways of setting in motion the water or air for reaction propulsion on my system.

Sheet I —Fig. 1 is a side view, half in section and half in elevation; and, Sheet II.

The drum $a$ is provided with eight floats, $b$, to which rollers are attached which run in the cam $c$, and the floats are thus drawn in and driven out as the drum revolves, and, by protruding through it into the water-courses, act upon the water to propel the vessel by reaction at the end $d$ in the direction of the long arrow underneath. The water-course of the double-action propeller is divided into three channels, having their inlets at one end and outlets at the other. The mid-channel $e$ passes only through the front part of the casing, and the water is propelled directly by the floats. The other channel, $f$, passes above $e$, and is made in a spiral form so as to pass to the back of the propeller, where it drops to the same level as $e$, and forms the water-course for the floats. These are again moved out by the cams $c$ to propel the water forward and round to the outlet at the lower level. The floats thus act on the water in the top and bottom channels, so that, the two entering and two pressure waters being opposite each other, the pressure of the water on the drum at the four opposite quarters is the same, which prevents any pressure against the axle, except that due to the weight of the drum.

In Sheet III, Figs. 1 and 2 represent my reaction propelling-tube, with divergent entrance and exit, and my expanding and contracting valves, and a single-acting hydro-propeller working in such tube. I call these nozzles permanent contracted vein-nozzles, because they give approximately the same excellent results as the contracted vein through a thin plate, and prevent the loss of *vis viva* by the formation of the contracted vein of the entering water. The nozzles $d$ are made divergent, like all my other reaction propelling-tubes, to prevent also the loss of *vis viva* by an entrance whose area is less than the area of the propelling-float and tube. A passage, $l$, leads from the side of the vessel at both ends of the propelling-tube into the reaction-tube, the mouth of this passage $l$ being divergent at the side of the vessel to take advantage of the velocity of the vessel, and the united area of the passage must be at least equal to the area of the propelling-float and tube $e$, to prevent the loss of *vis viva* from water impact in the pipe. An expanding-and-contracting valve, $m$, is at each end of and in the passage $l$, to open the end where the water is entering, and close the other end for reaction. These valves are self-acting, for the velocity of the entering water, equal to the velocity of the vessel, will force open one valve ($m$ in Sheet III) on the right, and the rod connecting the two valves will at the same time close the other valve for reaction. The object of these valves is for high velocities of vessels, to enable the floats to move at less velocity than the feed-water, for which purpose the floats and reaction-tube are of larger area than that of the reaction-nozzles, as shown in Sheet III, Fig. 1.

Sheet IV represents my curved reaction propelling-tube, with divergent entrance at each end, without my expanding-and-contracting valves. Here there is no steam-engine as the prime mover, because there is no hydro-propeller. But the prime mover and hydro-propeller are one in the shape of the steam-jet and several tubes. The steam from the boiler will issue through the hole at $c$, and set in motion a quantity of water through the first short tube. This tube will discharge into the next, and draw in a larger body of water at less velocity, and so on to the last tube. The whole mass of water will then be driven into my divergent curved reaction-tube, react at $r$, (on the left in Sheet IV, where the small arrow is,) and propel the vessel in the opposite direction, shown by the large arrow. The tubes are larger and larger from the steam-jet to the entrance of the reaction-tube, and are all bell-mouthed, each gradually diverging into the next, and polished inside to prevent friction. All are rigidly connected together and with the steam-jet $c$, and the whole are so connected by lever $d$ that they can be drawn in and out by the donkey-engine $e$. Three-way cocks $ff$ from the main pipe turn the steam on and off the steam-jets, and are made self-acting by being connected by links $gg$ to the levers $dd$, as they draw the steam-jets and tubes in and out for going ahead and backing. The steam-pipes $h$ have a telescopic action over the fixed branch pipes $i$, to enable them to move in and out. The cross-heads $j$ and tubes $c$ are firmly connected together by the steam-pipes $h$ and rods $k$, which work through the stuffing-boxes $l$. These cross-heads receive the motion from the levers $d$ by the links $m$, and are guided in their travel by the guide-rods $n$, which are bolted to the casing at one end, and fixed by the other end to the carriage $o$. The piston-rods $p$ of the donkey-engine $e$ act directly on the cross-heads $j$, as shown by the drawing, for moving the propelling apparatus in and out as required. The tubes have rollers $q$ affixed to them, which run on rails $r$, to enable the donkey-engine to move them more easily. The boxed recesses $s$, for the steam-jets and equivalent tubes, have sliding doors $t$, which can be lowered when the propelling apparatus is drawn in, by means of the screw-spindle $u$, working in nuts fixed to the back of the sliding doors $t$. These spindles have stuffing-boxes where they pass through the casing $v$, and have hand fly-wheels $w$ keyed on them above, as shown, to raise or lower the doors.

Sheet V, Fig. 1, is a transverse section through the ships, showing the donkey-engine and propelling apparatus.

Sheet VI.

To propel vessels by the reaction of water it is necessary to set it in motion in a pipe. It is therefore plain that whatever will do this, whether a hydro-propeller or jet of steam, will also feed boilers and do for other hydraulic purposes.

In Fig. 3, $a$ is the steam-jet; $b$, the regulating and shut-off cock; $c$, the water-supply pipe; and $d$, the tubes. $e$ is the discharge-pipe, furnished with a puppet or other valve, $f$, when feeding a boiler. The arrows show the direction in which the water flows.

Sheet VII, Fig. 1, represents my reaction cylindrical propelling-tube, with divergent entrance and exit, without my contracting-and-expanding valves, having a screw hydro-propeller working in such tube. Fig. 2 shows how the same reaction-tube may be varied by being curved into the vessel (like the steam-jet reaction-tube in Sheet IV) without altering the fundamental principles of hydro-propulsion discovered by me and embodied in such tube.

Sheet VIII, Fig. 1, is a half-vertical section of Fig. 1 in Sheet VII.

Sheet IX, Figs. 1 and 2, show a front and end elevation, on an enlarged scale, of a two-threaded screw hydro-propeller with part of the tube and frame removed.

The same letters refer to the same parts in these sheets.

The screw hydro-propeller shown in Sheets VII, VIII, and IX are four-threaded, and propel the vessel on the same principle of reaction as all the other hydro and jet propellers. Each pair can be driven by two or three engines, so that by reversing only one set of engines the steamer can be turned or maneuvered with greater facility than at present. The shaft for three engines for each pair of hydro-propellers is shown in the drawing. If one engine breaks down the other two may still propel. The screw hydro-propellers, Sheets VII, VIII, and IX, are connected and worked in the following manner: They have round them a toothed wheel, $j$, which fits into a driving-wheel, $k$, of larger dimensions than the propeller, in proportion to the number of revolutions required. These wheels are kept in gear by the frames $b\ b$, which are firmly secured to the cylindrical propelling-pipes round the screw hydro-propeller $f$, which pipe is connected by knife-edged arms $g$ both at entrance and exit. In the middle of the arms are found the bearings $h$, in which the shaft $i$ of the hydro-propeller $f$ revolves. Part of the cylinder $a$ and side of the vessel is cut away to allow the driving-wheel $k$ to fit into the toothed wheel $j$ round the hydro-propeller, as shown in the drawing. The driving-wheel $k$ is fixed on the shaft and revolves in the bearings $m\ m$, formed on part of the frame $b$. The case $d$ is provided with stuffing-boxes $r\ r$, through which the shaft $l$ passes, and is driven by the engines.

Sheet X, Fig. 1, is a transverse section of a ship fitted with four hydro-propellers, whose floats are worked by cams in the same way as shown in Sheet III, but without expanding- and-contracting valves. These four hydro-propellers are shown in Fig. 2, which is a plan of the ship's bottom, and through it the propellers work vertically into four of my reaction propelling-tubes, all with divergent entrance and exit underneath the vessel. The forward propellers are worked by a pair of engines independently of the after propellers, which are also worked by a pair of engines. The engine-shafts pass through stuffing-boxes $a$ in the water-tight cases $b$, in which the propellers work. Fig. 2, in the same sheet, shows how the ship is turned on its center. The forward engines only are reversed, and one of the forward cut-off valves, $c$, shut, and the valve $d$, at the side of the tube, opened. The cut-off valve $c$ of one of the stern propellers on the opposite side must also be shut at the stern end of the tube, and the valve $d$, at the side of such tube, opened. The water will then be forced out with the whole force of the engine at right angles from two of the propeller-tubes on opposite sides of the vessel and horizontally from the other two, and as the distance of leverage will be considerable, the ship will readily obey such powerful influences and turn in a small compass.

Sheet X, Figs. 3, 4, and 5, show elevation, sectional, plan, and end views, looking forward, of a steamer fitted with twin-screw hydro-propellers working in my reaction propeller-tubes, with divergent entrance and exit. These figures are given to show how my reaction-tubes, with screw hydro-propellers in them, may be applied direct without the wheel and case shown in Sheets VII, VIII, and IX.

Figure 1:
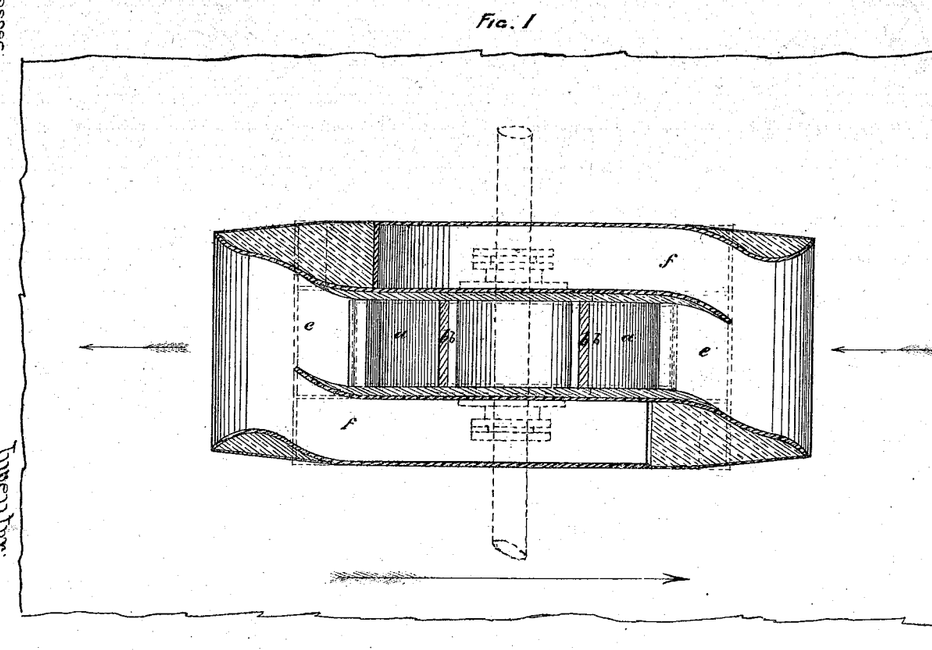
—Figure 1 is a sectional plan of my reaction propelling-tube with divergent entrance and exit, but without my contracting and expanding valves, having my double-action hydro-propeller working therein. Sheet II
Figures 1, 2, 3:
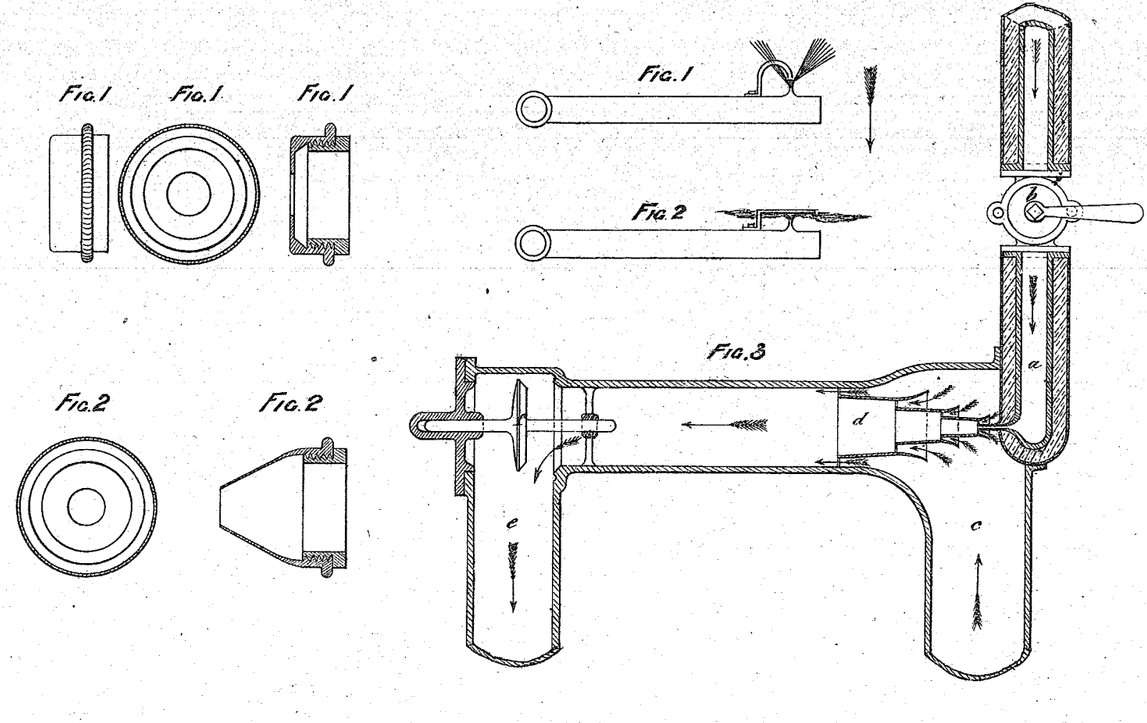
Fig. 2 is a transverse section through the center.
Fig. 3, represents my steam-jet tubes' pump, which is nothing more than my steam-jet propeller in Sheet IV, only in a straight pipe instead of a curved one.
Figures 1, 2:
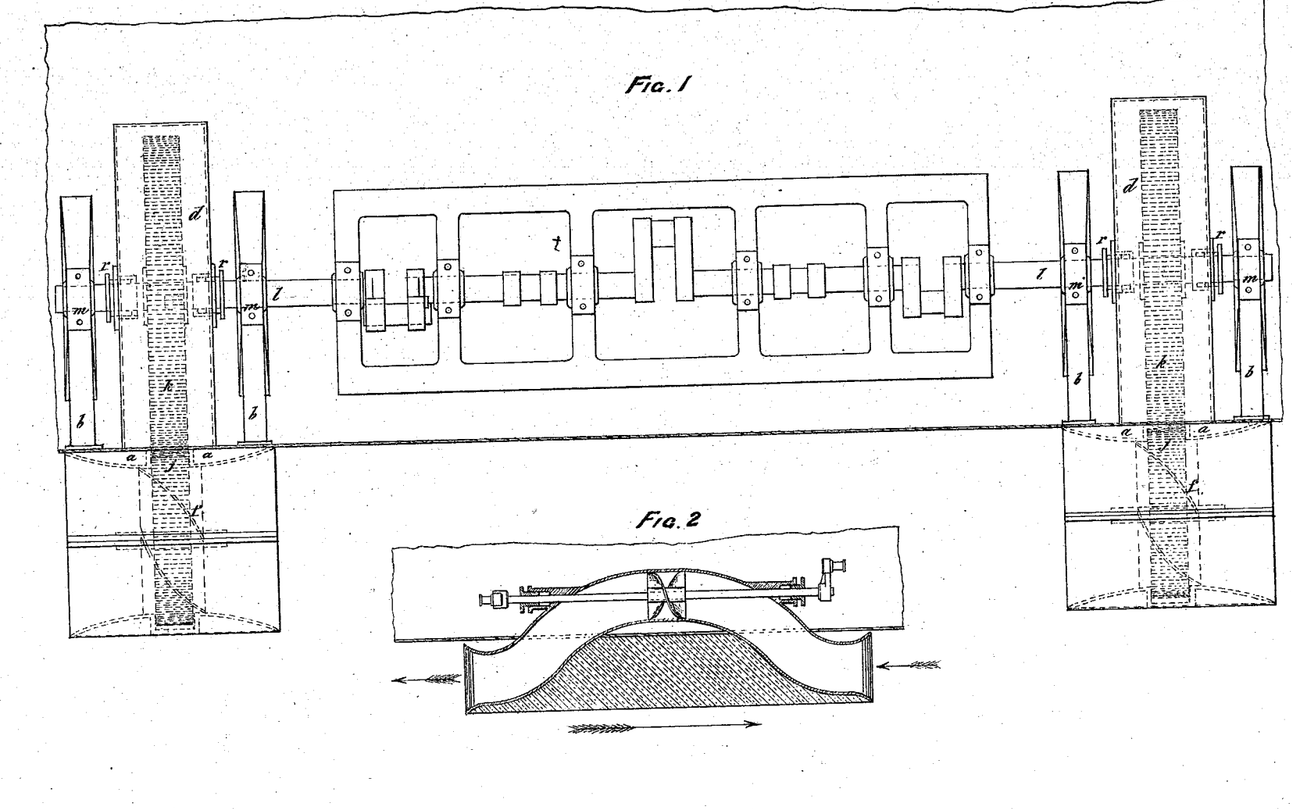
Figures 1, 2, 3, 4, 5:
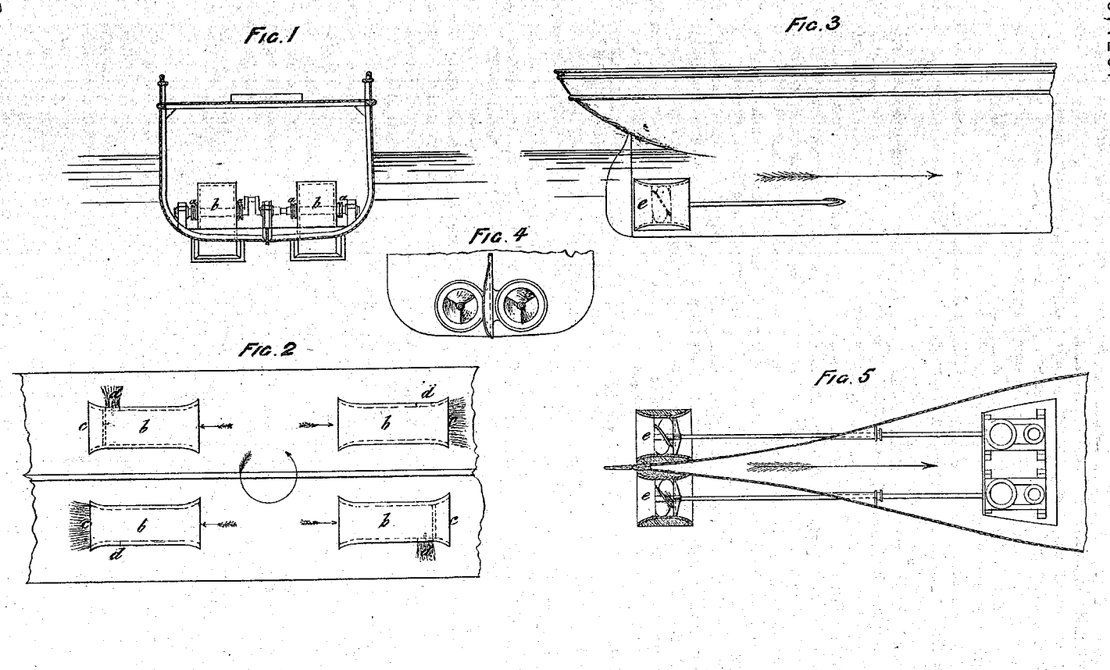
Figure 2:
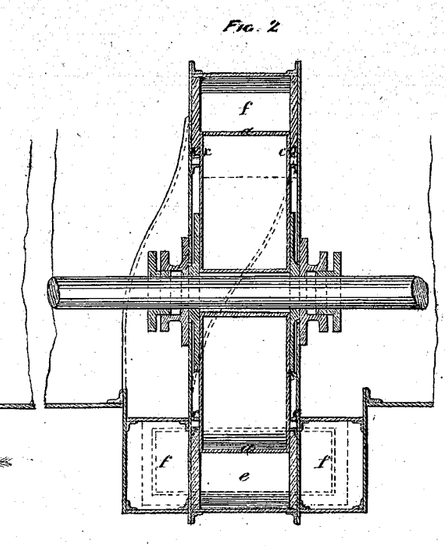

In all the different methods of setting the water in motion for a reaction propulsion the propelling-tubes are either horizontal on each side of the vessel outside, and as deep down as convenient, or else beneath the vessel; and in every case the vessel is backed by reversing the engines and propellers except in my steam-jet equivalent tube's propulsion in Sheet IV, where the vessel is backed by drawing in the steam-jets and tubes on the right-hand side and moving out the steam-jet and tubes on the left hand, where the small arrows are.

All the machinery hereinbefore described and shown in the drawing has been already described in the specifications of my different English patents, beginning with the one in 1866.

I do not claim a reaction-tube which is contracted at both ends, and which runs the whole length of the vessel; nor one running the whole length of the vessel if uncontracted at both ends; nor one that takes in the propelling water at right angles from the side of the vessel, whether contracted or uncontracted at the entrance; nor one that takes in the propelling water at the bow through several holes and is then enlarged, as in the English patent of John Ruthven and Morris West Ruthven, of the 20th of March, 1839, No. 8,006, Sheet II; nor one that draws up the propelling water vertically beneath the vessel, as in the English patent to John Ruthven of the 10th of August, 1849, No. 12,739, Sheets I and II; in the English patent also of William Hale, of the 12th of January, 1830, No. 5,879, and his subsequent patent of the 13th of October, 1831, No. 6,180.

I do not claim a reaction-tube in which a screw acts in the form and arrangement which are described in the specification of the English patent of William Hale, of the 22d December, 1827, page 1, line 20, to page 2, line 3, and in page 3, line 5, and shown in the drawing thereto; nor do I claim the principles or internal application contained in the said William Hale's subsequent English patent of the 22d of March, 1836, No. 7,040; nor do I claim the principles or internal application of Robert Walker, Jr., contained in his English patent of the 18th of May, 1843, No. 9,733, where the feed-water is ejected for propelling beneath the vessel or through two pipes running through the vessel; nor do I claim the principles or application contained in the English patent of George Alfred De Penning, dated the 31st of May, 1854, No. 1,205; but—

What I claim as my invention is—

The tubes for steam-jet propelling and backing, in combination with the curved re-action-tube, for propulsion, operating substantially as and for the purpose set forth.

R. BOYMAN BOYMAN.

Witnesses:
I. C. MEWBURN,
    172 *Fleet Street, London.*
GEO. BACON,
    172 *Fleet Street, London.*